United States Patent
Kim et al.

(10) Patent No.: US 9,847,155 B2
(45) Date of Patent: Dec. 19, 2017

(54) METHOD OF MANUFACTURING ELECTRICALLY CONDUCTIVE STRETCHABLE INTERCONNECT USING TWISTED NATURE OF YARN FIBERS

(71) Applicant: Electronics and Telecommunications Research Institute, Daejeon (KR)

(72) Inventors: Ji-Eun Kim, Daejeon (KR); Yong-Ki Son, Daejeon (KR); Jong-Moo Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/006,497

(22) Filed: Jan. 26, 2016

(65) Prior Publication Data

US 2016/0217885 A1 Jul. 28, 2016

(30) Foreign Application Priority Data

Jan. 27, 2015 (KR) ........................ 10-2015-0012941

(51) Int. Cl.
*B29C 45/14* (2006.01)
*H01B 19/04* (2006.01)

(52) U.S. Cl.
CPC ............. *H01B 19/04* (2013.01); *B29C 45/14* (2013.01)

(58) Field of Classification Search
None
See application file for complete search history.

(56) References Cited

U.S. PATENT DOCUMENTS

| | | | |
|---|---|---|---|
| 8,348,865 B2 | 1/2013 | Jeong et al. | |
| 8,436,820 B2 | 5/2013 | Jeong et al. | |
| 9,247,648 B2 * | 1/2016 | Vanfleteren | |
| 9,554,465 B1 * | 1/2017 | Liu | H05K 1/092 |
| 9,613,911 B2 * | 4/2017 | Rogers | H01L 23/5387 |
| 2012/0051005 A1 * | 3/2012 | Vanfleteren | H01L 21/565 361/749 |
| 2017/0098491 A1 * | 4/2017 | Ziaie | H01B 7/04 |

FOREIGN PATENT DOCUMENTS

| | | |
|---|---|---|
| KR | 10-2010-0063595 A | 6/2010 |
| KR | 10-2010-0064299 A | 6/2010 |
| KR | 10-1067703 B1 | 9/2011 |
| KR | 10-2014-0095704 A | 8/2014 |

* cited by examiner

*Primary Examiner* — Edmund Lee
(74) *Attorney, Agent, or Firm* — Nelson Mullins Riley & Scarborough LLP; Anthony A. Laurentano (57) ABSTRACT

Disclosed herein are an electrically conductive stretchable interconnect using a twisted nature of yarn fibers and a method of manufacturing the same. According to an exemplary embodiment of the present invention, the electrically conductive stretchable interconnect includes: an elastic body in which a stretchable tunnel is formed in a length direction; and a conductive twisted yarn including a stretchable structure positioned inside the stretchable tunnel and extended by a force applied in the length direction and an extending part extending from the stretchable structure to an outside of the elastic body.

11 Claims, 7 Drawing Sheets

METHOD OF MANUFACTURING ELECTRICALLY CONDUCTIVE STRETCHABLE INTERCONNECT USING TWISTED NATURE OF YARN FIBERS

CROSS REFERENCE TO RELATED APPLICATION

This application claims the benefit of Korean Patent Application No. 10-2015-0012941, filed on, Jan. 27, 2015, entitled "Electrically Conductive Stretchable Interconnect Using Twisted Nature of Yarn Fibers And method of manufacturing the same", which is hereby incorporated by reference in its entirety into this application.

BACKGROUND OF THE INVENTION

1. Technical Field

The present invention relates to an interconnect, and more particularly, to an electrically conductive stretchable interconnect capable of maintaining electrical properties even when the interconnect is repeatedly stretched and a method of manufacturing the same.

2. Description of the Related Art

Electronic circuits having excellent flexibility and stretchability are needed to implement a wearable apparatus that may be attached to a human body or an apparatus that may be used as a skin of a robot. An electronic apparatus of which the shape is changed to meet motions such as twisting the human body and bending, unfolding, and extending an arm of the robot may be developed by using the electronic circuits having excellent flexibility and stretchability. As a result, various researches for implementing electronic circuits having flexibility and stretchability have been conducted worldwide.

According to the existing researches known up to now, a stretchable and restorable interconnect connecting between the electronic circuits has been mostly implemented by two methods.

One method forms the interconnect by forming metal conductors having excellent electric conductivity as a two-dimensional or three-dimensional stretchable structure and then burying at least one of the metal conductors into a stretchable and restorable elastic body. The two-dimensional or three-dimensional stretchable structure has bent shapes such as a horseshoe shape, a zigzag shape, a helical shape, and a wave shape. When a bending radius of the stretchable structure is increased, a tensile length is increased but a disposition area of a circuit line is increased to make it difficult to dispose several lines. When the bending radius having the stretchable structure is decreased, a stress applied to a conductor is increased and thus the conductor may be easily fractured upon the repeated tension. Therefore, a conductor having excellent mechanical properties needs to be used.

The other method uses a conductive elastic material. The conductive elastic material having electric conductivity may be formed by fusing nano composites such as CNT and graphene with the elastic material. The conductive elastic material has elasticity but very low electric conductivity. As a result, the elastic conductor is hard to be actually used as the interconnect of the electronic circuits.

Another material used as a conductor in a flexible electronic field is a conductive fiber. Generally, the fiber has various advantages such as diversity of a processing method of drawing (twist), weaving, etc., porosity and wide surface area of the fiber, diversity of surface treatment, and easiness of a composite material composition. In addition to the above advantages, the conductive fiber having electrical properties has been used as an important material even in various electrical and electronic fields. The conductive fiber has been utilized in a textile solar cell, a stretchable transistor, a stretchable display, external stimulus type drug delivery, a biosensor and a gas sensor, light control functional textile, functional clothes, functional products for defense industry, and so on.

The conductive fiber may be processed by various methods in accordance with the use purpose. A representative example may include a conductive twisted yarn formed by twisting the conductive fiber, a conductive sheet formed by weaving or spinning the conductive fiber, a conductive ribbon formed by knitting the conductive twisted yarn, and a conductive tape to which conductive epoxy is added.

Among those, the conductive twisted yarn (or conductive yarn) is mostly used as the interconnect. There are largely two kinds of conductive twisted yarns.

There is a conductive filament yarn formed by braiding the existing metal wires such as copper (Cu) and stainless steel with the existing fiber. The conductive filament yarn uses the existing metal conductor and therefore has excellent electric conductivity but poor durability.

There is a conductive coating yarn formed by coating the existing fibers such as nylon and polyester with conductive materials such as nickel (Ni) and silver (Ag). The conductive coating yarn is formed by coating a surface of fiber like nylon 66 having excellent mechanical properties such as tensile strength, tensile modulus, elongation, bending modulus, and torsional strength with conductive compounds like silver having excellent electric conductivity. Therefore, the conductive coating yarn has electric conductivity lower than that of the metal conductor but very excellent durability.

SUMMARY OF THE INVENTION

The present invention has been made in an effort to provide an electrically conductive stretchable interconnect capable of having remarkably improved durability by a simple manufacturing method and a method of manufacturing the same. That is, the present invention has been made in an effort to provide an electrically conductive stretchable interconnect capable of maintaining electric conductivity and having excellent durability even when the interconnect is repeatedly stretched and restored.

However, objects of the present invention are not limited to the above-mentioned matters and other objects can be clearly understood to those skilled in the art from the following descriptions.

According to an exemplary embodiment of the present invention, the electrically conductive stretchable interconnect includes: an elastic body in which a stretchable tunnel is formed in a length direction; and a conductive twisted yarn including a stretchable structure positioned inside the stretchable tunnel and extended by a force applied in the length direction and an extending part extending from the stretchable structure to an outside of the elastic body.

The stretchable structure may be separated from the elastic body.

The stretchable structure may have a helically twisted structure.

The electrically conductive stretchable interconnect may further include: a crimping contact electrically connected to the extending part.

The conductive twisted yarn may be a conductive coating yarn.

The conductive twisted yarn may be formed by braiding at least two single yarns.

The conductive twisted yarn may be plural and the plurality of conductive twisted yarns may be each disposed in the length direction and be spaced apart from each other for electrical insulation.

According to another exemplary embodiment of the present invention, a method of manufacturing an electrically conductive stretchable interconnect includes: injecting an elastic material into a mold to which a conductive twisted yarn is fixed in a length direction; hardening the elastic material to form an elastic body; and forming a stretchable structure in at least a portion of the conductive twisted yarn by applying a tensile force to the elastic body in the length direction.

The forming of the stretchable structure in the at least a portion of the conductive twisted yarn by applying the tensile force to the elastic body in the length direction may include: clamping both ends of the elastic body; forming a stretchable tunnel, in which the stretchable structure is positioned, inside the elastic body by tensioning at least one of the clamped both ends of the elastic body in the length direction; and restoring the elastic body to an initial state by removing the tensile force.

In the forming of the stretchable tunnel, in which the stretchable structure is positioned, inside the elastic body by tensioning the at least one of the clamped both ends of the elastic body in the length direction, the conductive twisted yarn may be separated from the elastic body.

In the restoring of the elastic body to the initial state by removing the tensile force, the at least a portion of the conductive twisted yarn positioned inside the stretchable tunnel may become the stretchable structure extended by a force applied in the length direction.

The stretchable structure may have a helically twisted structure.

The method may further include: prior to the injecting of the elastic material into the mold to which the conductive twisted yarn is fixed in the length direction, degassing bubbles from the elastic material which is in a liquid state.

The conductive twisted yarn may be a conductive coating yarn.

The conductive twisted yarn may be formed by braiding at least two single yarns.

The injecting of the elastic material into the mold to which the conductive twisted yarn is fixed in the length direction may include disposing each of the plurality of conductive twisted yarns to be spaced apart from each other in the length direction.

The elastic material may be silicon or rubber.

A length of the conductive twisted yarn may be longer than a maximum tensile length of the elastic body.

The maximum tensile length may be a tensioned length of the elastic body until the stretchable structure becomes a straight shape.

The method may further include: after the forming of the stretchable structure in the at least a portion of the conductive twisted yarn by applying the tensile force to the elastic body in the length direction, coupling a crimping contact with at least one of both ends of the conductive twisted yarn.

BRIEF DESCRIPTION OF THE DRAWINGS

Hereinafter, the present invention will be described with reference to exemplary embodiments illustrated in the accompanying drawings. To help understanding, throughout the accompanying drawings, like components are denoted by like reference numerals. Components illustrated in the accompanying drawings are only an example exemplarily implemented for describing the present invention and therefore do not limit the scope of the present invention.

DESCRIPTION OF EXEMPLARY EMBODIMENTS

The present invention may be variously modified and have several exemplary embodiments. Therefore, specific exemplary embodiments of the present invention will be illustrated in the accompanying drawings and be described in detail in the present specification. However, it is to be understood that the present invention is not limited to the specific exemplary embodiments, but includes all modifications, equivalents, and substitutions included in the spirit and the scope of the present invention.

Figure 1:
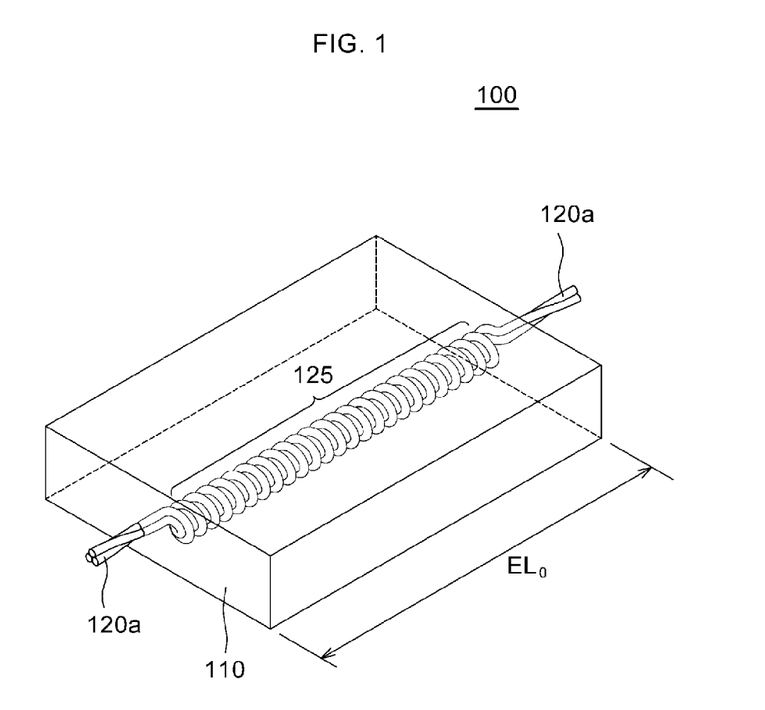
FIG. 1 is a perspective view exemplarily illustrating a structure of an electrically conductive stretchable interconnect using a twisted nature of yarn fibers.

FIG. 1 is a perspective view exemplarily illustrating a structure of an electrically conductive stretchable interconnect using a twisted nature of yarn fibers.

Referring to FIG. 1, an electrically conductive stretchable interconnect 100 has may be extended and restored and may originally maintain electric conductivity by burying a conductive twisted yarn having a stretchable structure but having insufficient stretchability into an elastic body having excellent stretchability and a restoring force. If a tensile force is applied in a length direction of the electrically conductive stretchable interconnect 100, an elastic body 110 is extended and therefore a stretchable structure 125 of the conductive twisted yarn having a helically twisted structure is unfolded. Therefore, the length of the conductive twisted yarn is extended and thus the overall length of the electrically conductive stretchable interconnect is extended. On the contrary, if the tensile force is reduced or removed, the restoring force is generated in an opposite direction to the direction in which the tensile force is applied and thus the elastic body 100 is reduced to an initial length. By the restoring force, the electrically conductive stretchable interconnect 100 is restored to the initial length while the stretchable structure 125 of the conductive twisted yarn again returns to the helically twisted structure.

The elastic body 110 may be made of elastic materials such as silicon (elastic polymer) including, for example, polydimethylsiloxane (PDMS), etc., and rubber having elasticity and stretchability. Here, the elastic material may be in a liquid state initially to be easily processed or molded and may be hardened at a predetermined time and temperature to be changed to a solid having elasticity and stretchability. Further, after the hardening, the elastic body 110 needs to be formed so that a portion of the elastic body 110 with which the conductive twisted yarn is contacted may be separated by the tensile force. If the conductive twisted yarn is separated from the elastic body 110, a stretchable tunnel is formed due to a space occupied by the conductive twisted yarn. The stretchable tunnel serves to induce the conductive twisted yarn to maintain the stretchable structure 125 within the stretchable tunnel. That is, the stretchable tunnel serves to induce the stretchable structure 125 of the conductive twisted yarn to have the helically twisted structure and maintain a shape of the helically twisted structure even though it is repeatedly twisted and released. To this end, the elastic material having appropriate modulus needs to be used. That is, if the elastic material is too hard and thus little has elasticity, the elastic material may be hard to form the helical structure.

The conductive twisted yarn includes the conductive coating yarn formed by coating a fiber yarn of nylon, polyester, etc., with conductive materials such as nickel (Ni), silver (Ag), etc. The basic electric conductivity of the conductive twisted yarn is determined depending on physical properties such as conductivity of the conductive materials coating the fiber yarn, a content of the conductive material, a coating thickness, and a coating method. Therefore, the physical properties may be variously selected according to the use purpose of the conductive twisted yarn. Generally, the conductive twisted yarn has electric conductivity lower than that of metal conductors such as a metal thin film and a metal wire and has electric conductivity higher than that of conductive elastic materials such as a carbon nanotube (CNT) elastic material and a metal nanowire elastic material. However, the conductive twisted yarn itself does not have elasticity, and therefore the conductive twisted yarn needs to be buried into the elastically restorable elastic body but includes a section in which the stretchable structure is formed.

If a conductive fiber single yarn (hereinafter, referred to as "single yarn") is braided (at least one single yarn) by, for example, twisting of triple helix, mechanical properties such as tensile strength, tensile modulus, elongation, bending modulus, and torsional strength are greatly improved. Several strands of twisted single yarns are collected and then are again twisted in an opposite direction to the single yarn to be able to be braided as a strong yarn like a rope. In particular, the twisted fiber yarn is wound in a twisted direction naturally when being applied with a specific tensile force. Further, a cross sectional area of the conductive twisted yarn is increased, and as a result, electrical properties such as electric conductivity are improved. On the other hand, if the number of braided single yarns is increased, a thickness of the conductive twisted yarn is increased and a flexure of the helically twisted structure is increased and a disposition area of the conductive twisted yarn is increased. Further, as the thickness of the conductive twisted yarn is thickened or the number of conductive twisted yarn is increased, the tensile force required to tension the elastic body 110 is increased. Therefore, the thickness, the disposition number, and the disposition position of the conductive twisted yarn may be changed according to applications to which the electrically conductive stretchable interconnect 100 is applied.

The stretchable structure 125 of the conductive twisted yarn formed in the helically twisted structure has an area less than that occupied by the existing conductive twisted yarn of the horseshoe shape, zigzag shape, helical shape, and wave shape, such that the plurality of conductive twisted yarns may be easily disposed. In the case of using the existing metal conductor having the general helical structure, a radius of a coil is increased and thus a signal distortion depending on the induction of inductance may occur. However, the present invention uses the conductive twisted yarn having excellent flexibility resistance, bending modulus, torsional strength, etc., and therefore may form the helically twisted structure with almost no empty space due to strong twisting. As a result, the disposition area required to form the conductive twisted yarn positioned inside the elastic body 110 as the stretchable structure 125 may be minimized to suppress the occurrence phenomenon of inductance without having trouble disposing a plurality of lines. Further, the helically twisted structure of high density may be formed. That is, for example, when the stretchable structure 125 is unfolded straight by the tensile force, the straight length may be substantially equal to a maximum tensile length of the elastic body 110. The density of the spiral twisted structure determines the tensile length (or tensile rate) based on the tensile force. That is, if the density of the helical structure is increased, the stretchable structure 125 may be more extended. If the maximum tensile length of the electrically conductive stretchable interconnect 100 is equal to that of the stretchable structure 125 made of the conductive twisted yarn, the situation that the user much more tensions the stretchable structure 125 beyond the maximum tensile length of the stretchable structure 125 may be prevented.

Figure 2A:
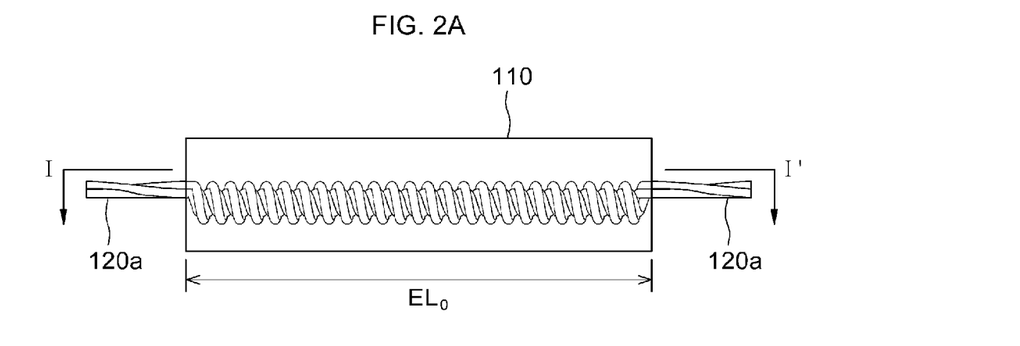
FIG. 2A is a side view of the electrically conductive stretchable interconnect of one conductive twisted yarn and FIG. 2B is a cross-sectional view of the electrically conductive stretchable interconnect of FIG. 2A taken along the line I-I'.
Figure 2B:
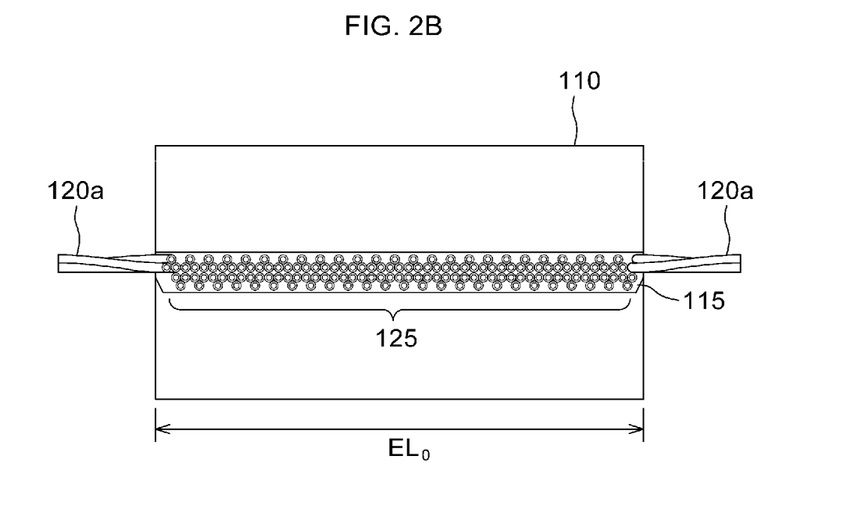

FIG. 2A is a side view of the electrically conductive stretchable interconnect of one conductive twisted yarn and FIG. 2B is a cross-sectional view of the electrically conductive stretchable interconnect of FIG. 2A taken along the line I-I'.

Referring to FIGS. 2A and 2B, the electrically conductive stretchable interconnect 100 includes the elastic body 110 and the conductive twisted yarn.

The elastic body 110 is formed to have a length $EL_0$ by using the elastic material and includes the stretchable tunnel 115 formed in a length direction. The stretchable tunnel 115 is provided with the conductive twisted yarn having the stretchable structure. The stretchable tunnel 115 is a space occupied by the conductive twisted yarn before the tensile force is first applied to the elastic body 110 in a length direction. If the tensile force is applied first, at least a portion of the conductive twisted yarn buried in the elastic body 110 is separated from the elastic body 110 and thus the stretchable tunnel 115 is formed. An area of an inlet of the stretchable tunnel 115 is substantially equal to a cross sectional area of the conductive twisted yarn and a cross sectional area of the inside thereof in the length direction in which the helically twisted structure is formed may be wider than the area of the inlet. That is, the cross sectional area of the stretchable structure 125 of the conductive twisted yarn has the helically twisted structure and therefore is wider than that of extending parts 120a and 120b.

The conductive twisted yarn includes the extending parts 120a and 120b and the stretchable structure 125. The conductive twisted yarn is formed by braiding a plurality of single yarns. Here, the conductive twisted yarn formed by braiding three single yarns is exemplarily described but is not necessarily limited thereto, and therefore the number of braided single yarns may be changed depending on applications to which the electrically conductive stretchable interconnect 100 is applied.

The extending parts 120a and 120b are a portion of the conductive twisted fiber in which the helically twisted structure is not formed and the extending parts 120a and 120b are extended outside from the end in the length direction of the elastic body 110. Here, a portion of the extending parts 120a and 120b may also be positioned inside the elastic body 110. For example, when the maximum tensile length of the stretchable structure 125 is smaller than the maximum tensile length of the elastic body 110, a point where the extending parts 120a and 120b are connected to the stretchable structure 125 may be positioned within the stretchable tunnel 115 of the elastic body 110. The extending parts 120a and 120b are used to be electrically connected to electronic components such as a printed circuit board.

The stretchable structure 125 is a portion of the conductive twisted yarn positioned inside the stretchable tunnel 115 of the elastic body 110 and has the helically twisted structure. The stretchable structure 125 is positioned within the stretchable tunnel 115 formed in the elastic body 110 in the length direction. Here, a curvature radius of the helical twisted structure may be very small, compared to the curvature radius of the existing helical structure made of metal, etc. Therefore, compared to the conductor having the existing helical structure, the area occupied within the elastic body 110 is very small. Further, the helically twisted structure of the stretchable structure 125 may be formed with almost no empty space and therefore the inductance does not occur. Therefore, it may be used as an electronic circuit line through which an electrical signal may be transferred between the electronic components. Meanwhile, even though the twisting and the releasing are repeated, due to the excellent torsional strength of the conductive twisted yarn and the bending modulus, the helically twisted structure may be maintained without being easily broken. In particular, the density of the helically twisted structure, that is, the frequency of twisting per unit length may be freely adjusted depending on the maximum tensile length of the elastic body 110 and/or the conductive twisted yarn.

Figure 3A:
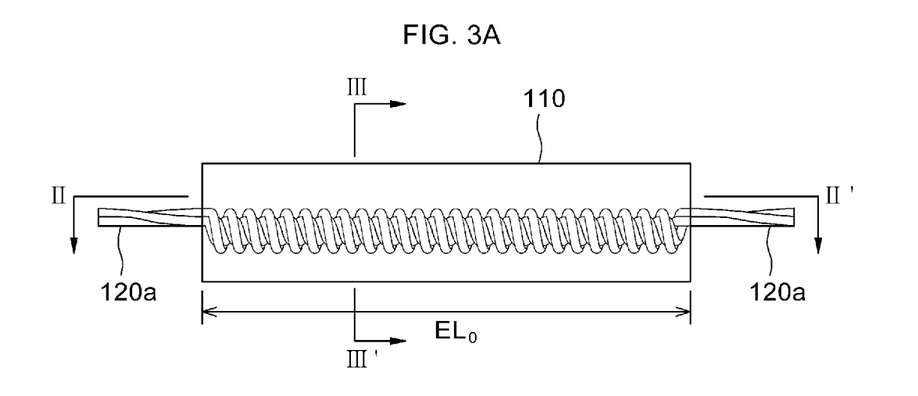
FIG. 3A is a side view of the electrically conductive stretchable interconnect of two conductive twisted yarns.
Figure 3B:
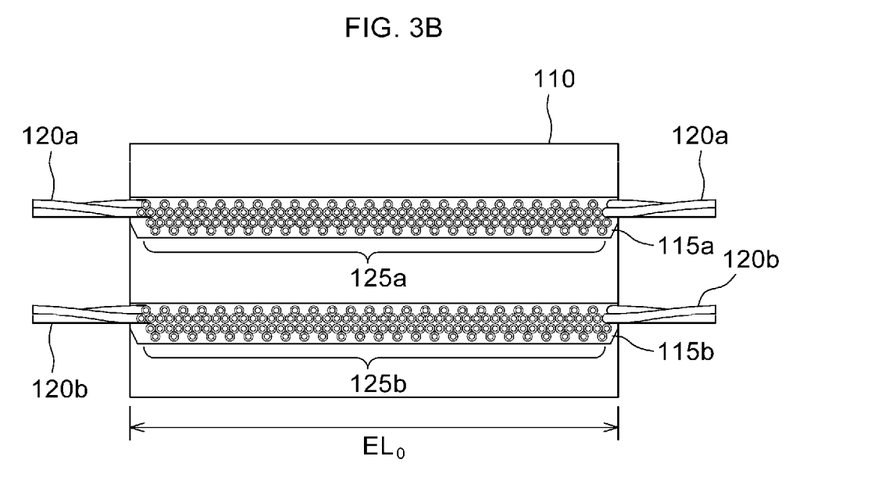
FIG. 3B is a cross-sectional view of the electrically conductive stretchable interconnect of FIG. 3A taken along the line II-II'.
Figure 3C:
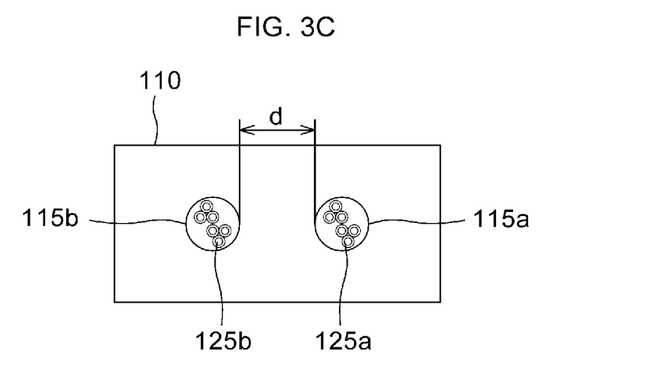
FIG. 3C is a cross-sectional view of the electrically conductive stretchable interconnect of FIG. 3A taken along the line III-III'.

FIG. 3A is a side view of the electrically conductive stretchable interconnect of two conductive twisted yarns, FIG. 3B is a cross-sectional view of the electrically conductive stretchable interconnect of FIG. 3A taken along the line II-II', and FIG. 3C is a cross-sectional view of the electrically conductive stretchable interconnect of FIG. 3A taken along the line III-III'. To avoid the overlapping description, the overlapping description with FIGS. 2A and 2B will be omitted.

Referring to FIGS. 3A and 3B, the electrically conductive stretchable interconnect 100 includes the elastic body 110 and a pair of conductive twisted fibers. FIGS. 3A to 3C describe, for example, the electrically conductive stretchable interconnect 100 of the pair of conductive twisted yarns, which is only an example. Therefore, the number of conductive twisted yarns may be at least two.

The elastic body 110 is formed to have the length $EL_0$ by using the elastic material and includes a pair of stretchable tunnels 115a and 115b formed in a length direction. Stretchable structures 125a and 125b of the pair of conductive twisted yarns having the stretchable structure are each positioned in the stretchable tunnels 115a and 115b. The stretchable structures 125a and 125b of the pair of conductive twisted yarns may be disposed to be spaced apart from each other by a distance d. Here, the distance d is an enough distance to electrically insulate between the stretchable structures 125a and 125b of the conductive twisted yarns but may be changed depending on the electrical properties of the conductive twisted yarn.

Meanwhile, in FIG. 3C, the cross sections of the stretchable tunnels 115a and 115b are illustrated in a circular form, which is only an example for description. At the beginning, the surfaces of the stretchable tunnels 115a and 115b have a shape corresponding to the surface of the conductive twisted yarn which is in a straight state. Next, the surfaces of the stretchable tunnels 115a and 115b may be elastically deformed in a shape corresponding to the shapes of the stretchable structures 125a and 125b of the conductive twisted yarns. In this case, at least some of the surfaces of the stretchable tunnels 115a and 115b may contact the stretchable structures 125a and 125b of the conductive twisted yarns. In the surfaces of the stretchable tunnels 115a and 115b, the shape and the area of the surface contacting the stretchable structures 125a and 125b of the conductive twisted yarns may be changed depending on the twisting and releasing state of the stretchable structures 125a and 125b of the conductive twisted yarns.

Figure 4:
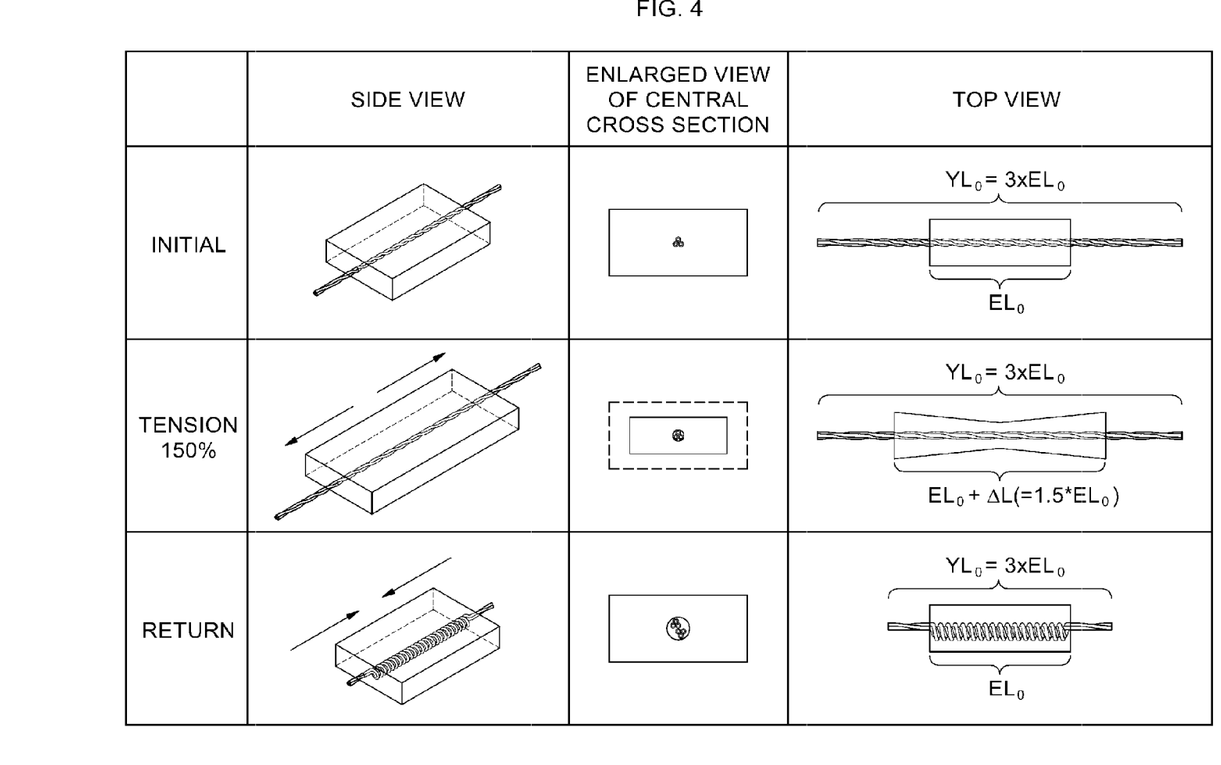
FIG. 4 is a diagram for exemplarily describing a method of manufacturing an electrically conductive stretchable interconnect.

FIG. 4 is a diagram for exemplarily describing a method of manufacturing an electrically conductive stretchable interconnect.

An exemplary method of manufacturing an electrically conductive stretchable interconnect may include: fixing at least one conductive twisted yarn to an inside of a mold; injecting an elastic material of a liquid material having elasticity into the mold when the elastic material is hardened; generating the elastic body by hardening the elastic material of the liquid material; removing the mold and acquiring the electrically conductive stretchable interconnect by burying the conductive twisted yarn into a center of a solid elastic body; and forming the stretchable structure of the conductive twisted yarn by once tensioning the elastic body of the electrically conductive stretchable interconnect and then restoring it. The method will be described in detail.

In an early stage, at least one conductive twisted yarn is fixed to the inside of the mold. Here, the fixing includes the case in which the conductive twisted yarn is directly fixed to the mold and the case in which the conductive twisted yarn is fixed by, for example, a clamp, etc., positioned at an outside of the mold. The mold has a shape in which at least one conductive twisted yarn is easily disposed inside the elastic body. Here, a shape of the elastic body may have various shapes such as a rectangle, a square, and a circle. Therefore, the mold may be manufactured in a shape corresponding to the elastic body. Meanwhile, the mold may not only include a vessel in which the liquid-state elastic material may be included, but also a mold for extruding or injection molding, for example. The conductive twisted yarn may be disposed in at least one mold. Here, the conductive twisted yarn needs to be maintained between the plurality of conductive twisted yarns for insulation at a predetermined interval and be enclosed with the elastic material of the liquid material.

The method includes preparing the elastic material prior to injecting the elastic material of the liquid material having elasticity into the mold while the elastic material is hardened, when at least one conductive twisted yarn is fixed to the inside of the mold. Generally, a silicon-based elastic material needs to be subjected to a process of mixing a main material with a hardener at a predetermined ratio and if necessary, an injector having a syringe form may be used.

When at least one conductive twisted yarn is fixed to the mold, the conductive twisted yarn needs to have a margin so as to be longer than the maximum tensile length of the electrically conductive stretchable interconnect, at the left and right of the mold other than the portion where it is buried into the liquid-state elastic material. Margin lengths of the conductive twisted yarn protruding to the outside of the mold are reduced from both sides if the tensile direction is both directions and therefore they are to be 1:1 at the left and right of the mold and the extending side is more reduced if the extending direction is one direction and therefore the extended side is longer than a side not extended.

Meanwhile, prior to injecting the liquid-state elastic material into the mold, an operation of degassing bubbles from the liquid-state elastic material may be first performed. Alternatively, the mold into which the liquid-state elastic material is injected may be put in a vacuum apparatus to degass bubbles.

Upon hardening the liquid-state elastic material, the mold may be fixed by, for example, a fixing apparatus such as a vise or a pressure apparatus such as a press, according to the shape of the mold.

Referring to an upper portion of FIG. 4, the electrically conductive stretchable interconnect acquired after the removal of the mold is in a state in which the solid elastic body is attached to the straight conductive twisted yarn without the stretchable structure. The stretchable structure may be formed in the conductive twisted yarn by a method for applying a tensile force to an electrically conductive stretchable interconnect in the length direction and then restoring it.

Referring to a middle portion of FIG. 4, first, the stretchable structure induction pipe is formed in the elastic body by applying the tensile force to the elastic body. The tensile force is applied to the elastic body of an initial length $EL_0$ and thus the elastic body is extended. The elastic body is made of a material easily extended while the conductive twisted yarn is made of a material not extended, and therefore the contact portion of the conductive twisted yarn with the elastic body is separated by the tensile force and a cylindrical pipe like the shape of the conductive twisted yarn is formed. This is the stretchable tunnel inducing the stretchable structure of the conductive twisted yarn. After the conductive twisted yarn and the elastic body are peeled from each other, the elastic body is easily extended.

Next, it is continuously extended up to the required tensile length, for example, the maximum tensile length of the elastic body. The margin of the conductive twisted yarn of the left and right as much as the extended length of the elastic body of the electrically conductive stretchable interconnect, for example, $\Delta L = 1.5 \times EL_0$ enters the stretchable tunnel. In this case, the conductive twisted yarn is still in the straight state. Since the elastic body is extended in the length direction, the central portion of the elastic body may have cross-sectional area much less than that of both ends thereof. On the other hand, the conductive twisted yarn positioned therein is still in the straight state and therefore the cross-sectional area of the stretchable tunnel is little changed.

Referring to a lower portion of FIG. 4, the conductive twisted yarn having the stretchable structure of the helically twisted structure is formed while the elastic body is restored to the initial position by removing the tensile force.

When the tensile force applied to the elastic body of the electrically conductive stretchable interconnect is removed, the elastic body tends to return to the initial length $EL_0$ by the self restoring force. In this case, the conductive twisted yarn of the stretchable tunnel remains while forming the helically twisted structure along the stretchable tunnel by the restoring force of the elastic body. For example, when the restoration is completed, the margin of the conductor appearing externally is reduced as much as the extended length $\Delta L$ ($=1.5 \times EL_0$). In the present example, a length $YL_0$ of the conductive twisted yarn is $3 \times EL_0$ slightly longer than the maximum tensile length $2.5 \times EL_0$ ($=EL_0 + \Delta L$) of the elastic body and the stretchable structure of the conductive twisted yarn is formed to be smaller than the maximum tensile length of the elastic body. As a result, the electrically connected stretchable interconnect may be stably operated as long as the elastic body is not fractured by the tension. However, when the tensile length is large, the length of the conductive twisted yarn used in the stretchable structure is increased and the electric conductivity is reduced in proportion to the length, and as a result, the length of the elastic body needs to be minimized according to the usage. Alternatively, as the used tensile length is set to be smaller than the maximum tensile length, the stress applied to the conductive twisted yarn is reduced. Therefore, the length of the elastic body needs to be determined in consideration of these characteristics. For example, even though the required tensile length of the interconnect is up to 100%, when the stretchable structure of the conductive twisted yarn is formed to be tensioned up to 150%, the stress depending on the repeated tension is much more reduced than the case in which the stretchable structure of the conductive twisted yarn is formed to be tensioned up to 100%, such that the interconnect may be more stably used.

According to the method of manufacturing an electrically conductive stretchable interconnect according to the exemplary embodiment of the present invention, the stretchable structure may be formed by first burying the conductive twisted yarn into the elastic body. Therefore, the tensile length may be freely adjusted during the formation of the stretchable structure without again designing the stretchable structure to meet the purpose.

According to the method of manufacturing an electrically conductive stretchable interconnect according to the exemplary embodiment of the present invention, the stretchable tunnel may be formed by using the phenomenon that the elastic body and the conductive twisted yarn are peeled from each other by the tensile force. Therefore, the stretchable structure may be formed without additional processes such as etching and cutting and additional structures.

According to the method of manufacturing an electrically conductive stretchable interconnect according to the exemplary embodiment of the present invention, the conductive twisted yarn may be independently operated within the stretchable tunnel. Therefore, the stretchable structure may be twisted and released only by the tensile force applied to the elastic body.

Meanwhile, when the electrically conductive stretchable interconnect is tensioned beyond the maximum tensile length, the conductive twisted yarn within the elastic body may be broken or the elastic body may be damaged, and therefore a kind of feedback to allow the user to recognize the maximum tension range during the tension is required. According to the method of manufacturing an electrically conductive stretchable interconnect according to the exemplary embodiment of the present invention, the point where the helically twisted structure applied to the conductive twisted yarn is completely unfolded upon the tension is the maximum tensile length and therefore the user may estimate the maximum tensile length while seeing the conductive twisted yarn buried into the transparent elastic body with his/her eyes. Therefore, the conductive twisted yarn may be adjusted not to deviate from the maximum tensile length and may thus be prevented from being tensioned excessively.

Figure 5:
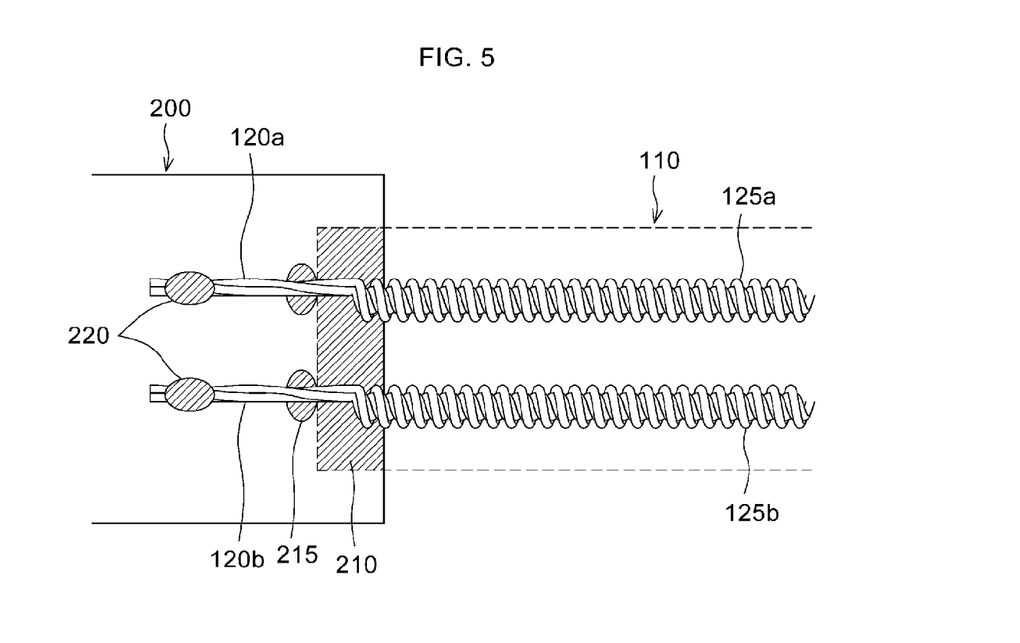
FIG. 5 is a diagram for exemplarily describing a method for connecting an electrically conductive stretchable interconnect to a printed circuit board.

FIG. 5 is a diagram for exemplarily describing a method for connecting an electrically conductive stretchable interconnect to a printed circuit board.

Generally, the conductive twisted yarn is connected to a printed circuit board 200 by a needlework/backstitch and a conductive adhesive. However, the needlework/backstitch has insufficient reliability for the electrical connection and adhesion of the conductive adhesive is more insufficient than that of the typical adhesive. In particular, in the case of the electrically conductive stretchable interconnect 100, an additional method for tolerating the tensile stress due the stretchable structures 125a and 125b is required and in some cases, a method for modularizing the electrically conductive stretchable interconnect 100 is required.

As an exemplary embodiment for fixing the electrically conductive stretchable interconnect 100 to the printed circuit board 200 and electrically connecting therebetween, there is a method using only the adhesive as illustrated in FIG. 5. One of both ends of the elastic body 100 is bonded to a first adhesive area 210 of the printed circuit board by the adhesive. Further, a portion of the extending parts 120a and 120b of the conductive twisted yarn is bonded to a second adhesive area 215 of the printed circuit board 200 by the adhesive. For the electrical connection with the printed circuit board 200, one end of the extending parts 120a and 120b of the conductive twisted yarn is bonded to an electrode pad 220 of the printed circuit board 200 by the conductive adhesive. In the case of the method, a tolerance for the tensile stress is determined by the adhesive area and the adhesion of the adhesive.

Figure 6:
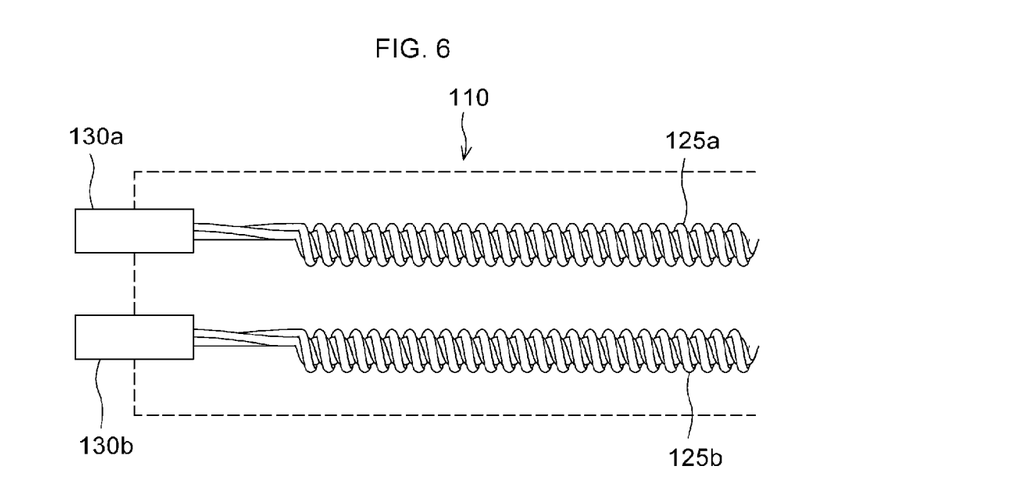
FIG. 6 is a diagram exemplarily illustrating the electrically conductive stretchable interconnect including a crimping contact for connecting to the printed circuit board.
Figure 7:
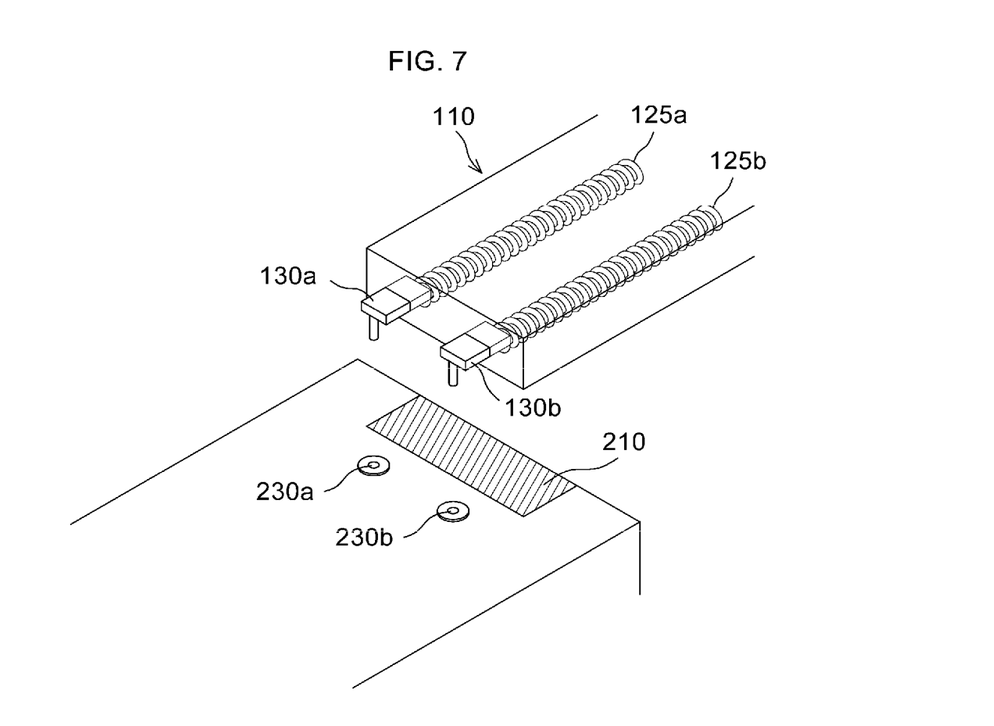
FIG. 7 is a diagram for exemplarily describing a method for connecting an electrically conductive stretchable interconnect of FIG. 6 to a printed circuit board.

FIG. 6 is a diagram exemplarily illustrating the electrically conductive stretchable interconnect including a crimping contact for connecting to the printed circuit board and FIG. 7 is a diagram for exemplarily describing a method for connecting an electrically conductive stretchable interconnect of FIG. 6 to a printed circuit board.

In the case of manufacturing the electrically conductive stretchable interconnect 100 in a module form having a predetermined standard, as illustrated in FIG. 6, a method for attaching an interconnect 100 to at least one of both ends of the conductive twisted yarn to crimping contacts 130a and 130b may be used. The crimping contacts 130a and 130b are physically fixed to one end of the conductive twisted yarn of the manufactured electrically conductive stretchable interconnect by a crimping tool and the electrical connection between the crimping contacts 130a and 130b and the one end of the conductive twisted yarn of the manufactured electrically conductive stretchable interconnect are strengthened by additionally using the conductive adhesive. Next, some of the crimping contacts 130a and 130b are inserted into the elastic body and are fixed by the typical adhesive, thereby tolerating the tensile stress. The used crimping contacts 130a and 130b may be considered in a straight form or a right angle form and the crimping contacts 130a and 130b are connected to the printed circuit board 200 by soldering. FIG. 7 illustrates a connection method of a printed circuit board of an electrically conductive stretchable interconnect module when the right-angle crimping contacts 130a and 130b are used. One of both ends of the elastic body 110 is bonded to the adhesive area 210 of the printed circuit board by an adhesive. For the electrical connection with the printed circuit board 200, the crimping contacts 130a and 130b are connected to electrode pads 230a and 230b of the printed circuit board 200 by, for example, the soldering, etc.

Figure 8A:
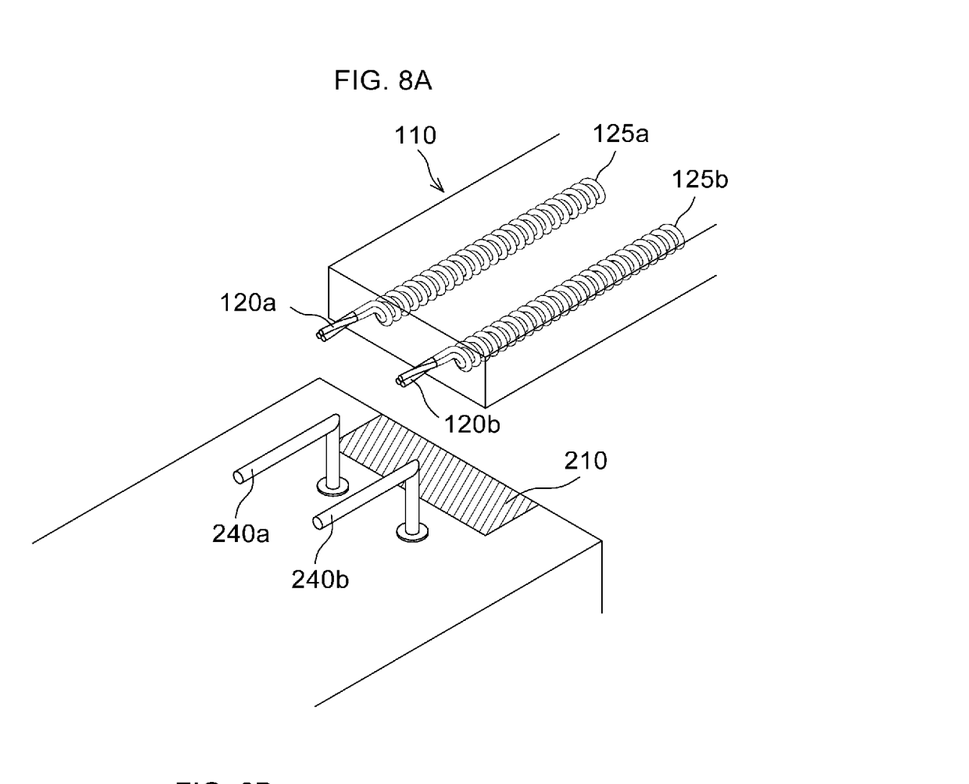
FIG. 8A is a diagram for exemplarily describing another method for connecting an electrically conductive stretchable interconnect to a printed circuit board and FIG. 8B is a diagram for exemplarily describing a connection method using a structure illustrated in FIG. 8A.
Figure 8B:
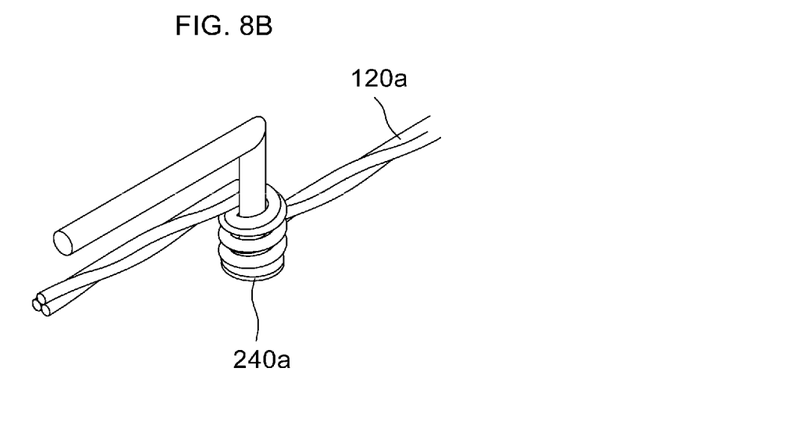

FIG. 8A is a diagram for exemplarily describing another method for connecting an electrically conductive stretchable interconnect to a printed circuit board and FIG. 8B is a diagram for exemplarily describing a connection method using a structure illustrated in FIG. 8A.

In the case of minimizing the area of the printed circuit board 200, as illustrated in FIG. 5, it may be difficult to increase the adhesive area of the electrically conductive stretchable interconnect 100 and the printed circuit board 200 to secure the sufficient conductivity. Therefore, to minimize the adhesive area and strengthening the electrical connection, as illustrated in FIGS. 8A and 8B, low-profile right-angle pin headers 240a and 240b are disposed on the printed circuit board 200 and the extending parts 120a and 120b are wound around the pin headers 240a and 240b to complete the electrical connection. In addition, some of the elastic body 110 is bonded to the adhesive area 210 of the printed circuit board 200 by the typical adhesive and the extending parts 120a and 120b wound around the pin headers 240a and 240b therewith may be applied with the conductive adhesive to strengthen the electrical connection.

According to the exemplary embodiments of the present invention, it is possible to provide the electrically conductive stretchable interconnect capable of having the remarkably improved durability by the simple manufacturing method and the method of manufacturing the same. That is, the present invention may provide the electrically conductive stretchable interconnect capable of maintaining the electric conductivity and having the excellent durability even when the interconnect is repeatedly stretched and restored.

The foregoing description of the present invention is only an example and those skilled in the art will appreciate that the present invention may be easily changed to other detailed forms, without departing from technical ideas or essential features of the present invention. Therefore, it is to be understood that the foregoing exemplary embodiments are exemplified in all aspects and are not limited.

It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. A method of manufacturing an electrically conductive stretchable interconnect, comprising:
    injecting an elastic material into a mold to which conductive twisted yarns are fixed in a length direction;
    hardening the elastic material to form an elastic body; and
    forming a stretchable structure in at least a portion of the conductive twisted yarn by applying a tensile force to the elastic body in the length direction,
    wherein a length of the conductive twisted yarn is longer than a maximum tensile length of the elastic body, and
    wherein the maximum tensile length is a tensioned length of the elastic body until the stretchable structure becomes a straight shape.

2. The method of claim 1, wherein the forming of the stretchable structure in the at least a portion of the conductive twisted yarn by applying the tensile force to the elastic body in the length direction includes:
    clamping both ends of the elastic body;

forming a stretchable tunnel, in which the stretchable structure is positioned, inside the elastic body by tensioning at least one of the clamped both ends of the elastic body in the length direction; and restoring the elastic body to an initial state by removing the tensile force.

3. The method of claim 2, wherein in the forming of the stretchable tunnel, in which the stretchable structure is positioned, inside the elastic body by tensioning the at least one of the clamped both ends of the elastic body in the length direction, the conductive twisted yarn is separated from the elastic body.

4. The method of claim 2, wherein in the restoring of the elastic body to the initial state by removing the tensile force, the at least a portion of the conductive twisted yarn positioned inside the stretchable tunnel becomes the stretchable structure extended by a force applied in the length direction.

5. The method of claim 4, wherein the stretchable structure has a helically twisted structure.

6. The method of claim 1, further comprising:

prior to the injecting of the elastic material into the mold to which the conductive twisted yarn is fixed in the length direction, degassing bubbles from the elastic material which is in a liquid state.

7. The method of claim 1, wherein the conductive twisted yarn is a conductive coating yarn.

8. The method of claim 1, wherein the conductive twisted yarn is formed by braiding at least two single yarns.

9. The method of claim 1, wherein the injecting of the elastic material into the mold to which the conductive twisted yarn is fixed in the length direction includes disposing each of the plurality of conductive twisted yarns to be spaced apart from each other in the length direction.

10. The method of claim 1, wherein the elastic material is silicon or rubber.

11. The method of claim 1, further comprising:

after the forming of the stretchable structure in the at least a portion of the conductive twisted yarn by applying the tensile force to the elastic body in the length direction, coupling a crimping contact with at least one of both ends of the conductive twisted yarn.

* * * * *